US012658713B2

(12) United States Patent
Zhang et al.

(10) Patent No.: US 12,658,713 B2
(45) Date of Patent: Jun. 16, 2026

(54) MPPT CONTROL METHOD AND DEVICE, AND STORAGE MEDIUM

(71) Applicant: Sungrow Renewables Development Co., Ltd., Hefei (CN)

(72) Inventors: Yanhu Zhang, Hefei (CN); Pengpeng Chen, Hefei (CN); Jiankai Chen, Hefei (CN); Shaokun Zou, Hefei (CN)

(73) Assignee: Sungrow Renewables Development Co., Ltd., Hefei (CN)

( * ) Notice: Subject to any disclaimer, the term of this patent is extended or adjusted under 35 U.S.C. 154(b) by 0 days.

(21) Appl. No.: 18/746,524

(22) Filed: Jun. 18, 2024

(65) Prior Publication Data

US 2025/0118972 A1     Apr. 10, 2025

(30) Foreign Application Priority Data

Oct. 8, 2023     (CN) .......................... 202311302121.7

(51) Int. Cl.
*H02J 3/46* (2026.01)
*H02J 3/007* (2026.01)
*H02J 101/24* (2026.01)

(52) U.S. Cl.
CPC .............. *H02J 3/46* (2013.01); *H02J 3/0075* (2020.01); *H02J 2101/25* (2026.01)

(58) Field of Classification Search
CPC ........ H02J 1/10; H02J 1/12; H02J 3/46; H02J 3/0075; H02J 2300/26
USPC .......................................................... 307/80
See application file for complete search history.

(56) References Cited

FOREIGN PATENT DOCUMENTS

EP          4084326 B1 * 10/2025 .............. H02J 3/381

* cited by examiner

*Primary Examiner* — Hal Kaplan
(74) *Attorney, Agent, or Firm* — Wolf, Greenfield & Sacks, P.C.

(57) ABSTRACT

An MPPT control method and device, and a storage medium are provided. Power loss at the direct-current side of the photovoltaic inverter and conversion efficiency loss in an inverter circuit in the photovoltaic inverter affect efficiency of the photovoltaic inverter. The direct-current loss indicates power loss occurring at a direct-current side of the photovoltaic inverter. The conversion efficiency loss indicates power loss in the inverter circuit. The photovoltaic inverter is MPPT controlled based on the direct-current loss and/or the conversion efficiency loss. Therefore, the efficiency of the photovoltaic inverter can be improved based on the direct-current loss and/or the conversion efficiency loss, thereby increasing energy yield of the photovoltaic system.

15 Claims, 10 Drawing Sheets

Determine direct-current loss when a photovoltaic inverter is in operation, where the direct-current loss indicates power loss occurring at a direct-current side of the photovoltaic inverter — S10

Determine conversion efficiency loss in an inverter circuit when the photovoltaic inverter is in operation, where the conversion efficiency loss indicates power loss in the inverter circuit — S20

MPPT control the photovoltaic inverter based on the direct-current loss and/or the conversion efficiency loss — S30

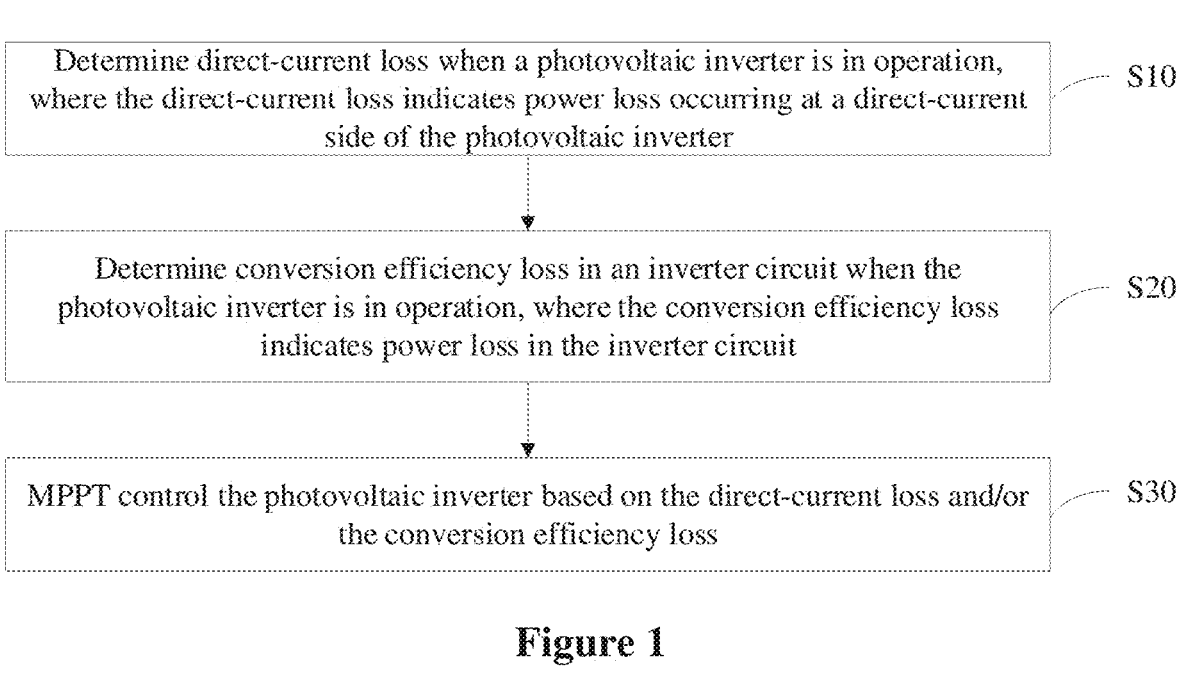

Determine direct-current loss when a photovoltaic inverter is in operation, where the direct-current loss indicates power loss occurring at a direct-current side of the photovoltaic inverter — S10

Determine conversion efficiency loss in an inverter circuit when the photovoltaic inverter is in operation, where the conversion efficiency loss indicates power loss in the inverter circuit — S20

MPPT control the photovoltaic inverter based on the direct-current loss and/or the conversion efficiency loss — S30

Figure 1

Determine mismatched parallel loss when a photovoltaic inverter is in operation, where the mismatched parallel loss indicates power loss occurring when photovoltaic cells are connected in parallel — S101

Determine direct-current converter efficiency loss when the photovoltaic inverter is in operation, where the direct-current converter efficiency loss indicates power loss in a direct-current conversion circuit — S102

Determine conversion efficiency loss in an inverter circuit when the photovoltaic inverter is in operation, where the conversion efficiency loss indicates power loss in the inverter circuit — S20

MPPT control the photovoltaic inverter based on the direct-current loss and/or the conversion efficiency loss — S30

Figure 2

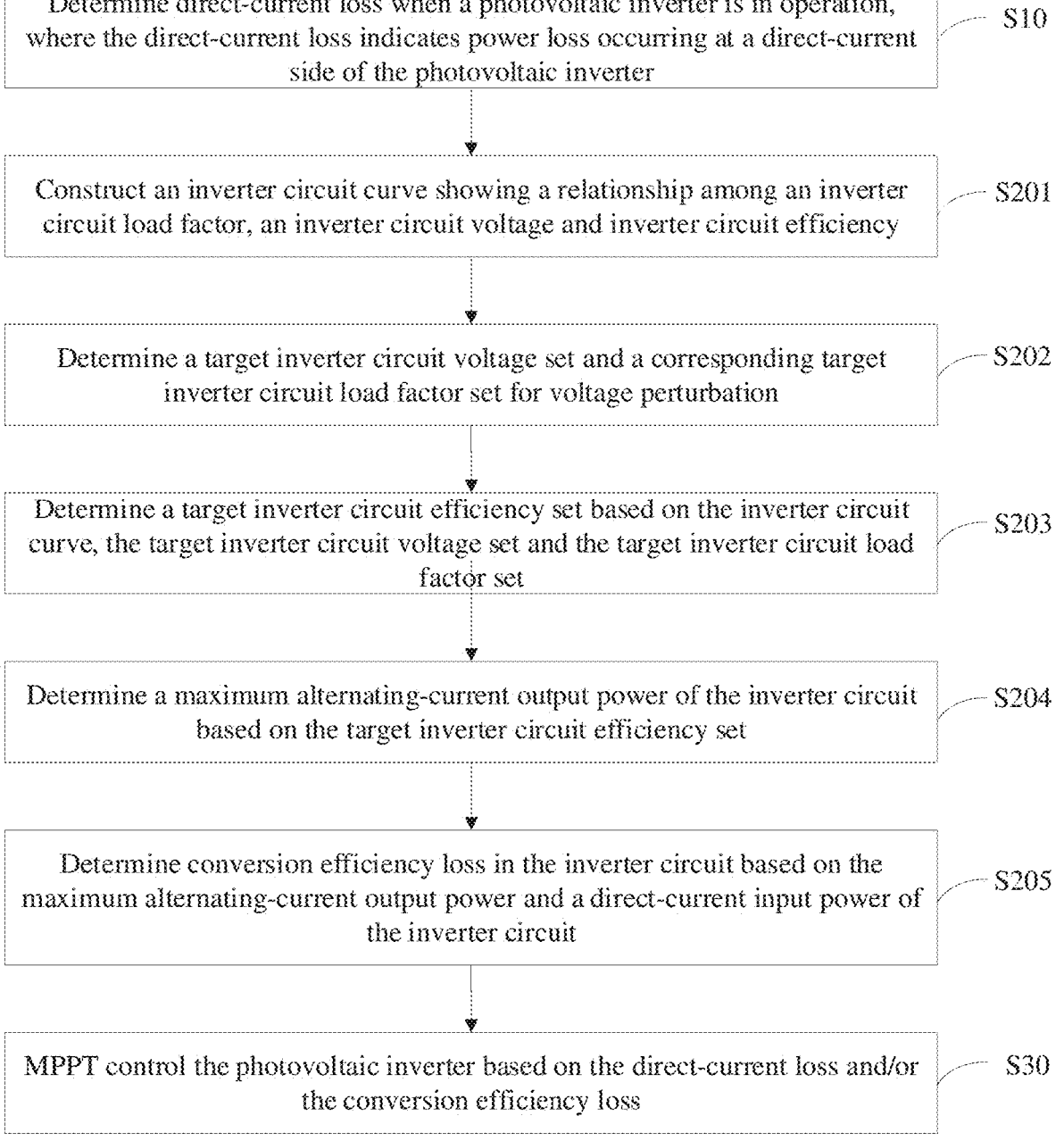

Determine direct-current loss when a photovoltaic inverter is in operation, where the direct-current loss indicates power loss occurring at a direct-current side of the photovoltaic inverter — S10

Construct an inverter circuit curve showing a relationship among an inverter circuit load factor, an inverter circuit voltage and inverter circuit efficiency — S201

Determine a target inverter circuit voltage set and a corresponding target inverter circuit load factor set for voltage perturbation — S202

Determine a target inverter circuit efficiency set based on the inverter circuit curve, the target inverter circuit voltage set and the target inverter circuit load factor set — S203

Determine a maximum alternating-current output power of the inverter circuit based on the target inverter circuit efficiency set — S204

Determine conversion efficiency loss in the inverter circuit based on the maximum alternating-current output power and a direct-current input power of the inverter circuit — S205

MPPT control the photovoltaic inverter based on the direct-current loss and/or the conversion efficiency loss — S30

Figure 7

MPPT CONTROL METHOD AND DEVICE, AND STORAGE MEDIUM

The present application claims priority to Chinese Patent Application No. 202311302121.7, titled "MPPT CONTROL METHOD AND DEVICE, AND STORAGE MEDIUM", filed on Oct. 8, 2023 with the China National Intellectual Property Administration, which is hereby incorporated by reference in its entirety.

FIELD

The present disclosure relates to the technical field of photovoltaics, and in particular to a maximum power point tracking (MPPT) control method and device, as well as a storage medium.

BACKGROUND

As an energy conversion device, a photovoltaic inverter in a photovoltaic system converts direct current power generated by photovoltaic cells into alternating current power supplied to the power grid. Most small and medium power inverters each include an inverter circuit and multiple direct-current chopper circuits connected in parallel. The photovoltaic cells are connected to the direct-current bus via respective direct-current chopper circuits, and then are connected to the inverter circuit. However, the energy yield of the photovoltaic system with this photovoltaic inverter is relatively low due to great loss. Therefore, how to improve the efficiency of the photovoltaic inverter and increase the energy yield of the photovoltaic system is a technical problem to be solved urgently.

The foregoing is described for only facilitating understanding of the technical solution of the present disclosure, instead of being acknowledged as prior art.

SUMMARY

An MPPT control method and device, as well as a storage medium are provided according to the present disclosure, to improve the efficiency of a photovoltaic inverter and increase energy yield of a photovoltaic system.

In order to solve the above technical problem, an MPPT control method is provided according to the present disclosure. The method is applied to a photovoltaic inverter. The photovoltaic inverter includes: an inverter circuit, and multiple direct-current conversion modules connected in parallel. The direct-current conversion modules each include a direct-current conversion circuit and a bypass switch connected in parallel. An input terminal of each of the direct-current conversion modules is connected to a photovoltaic cell. The MPPT control method includes: determining direct-current loss when the photovoltaic inverter is in operation, where the direct-current loss indicates power loss occurring at a direct-current side of the photovoltaic inverter; and/or determining conversion efficiency loss in the inverter circuit when the photovoltaic inverter is in operation, where the conversion efficiency loss indicates power loss in the inverter circuit; and MPPT controlling the photovoltaic inverter based on the direct-current loss and/or the conversion efficiency loss.

In an embodiment, the direct-current loss includes mismatched parallel loss and direct-current converter efficiency loss. The determining the direct-current loss when the photovoltaic inverter is in operation includes: determining the mismatched parallel loss when the photovoltaic inverter is in operation, where the mismatched parallel loss indicates power loss occurring when the photovoltaic cells are connected in parallel; and determining the direct-current converter efficiency loss when the photovoltaic inverter is in operation, where the direct-current converter efficiency loss indicates power loss in the direct-current conversion circuit.

In an embodiment, the determining the mismatched parallel loss when the photovoltaic inverter is in operation includes: determining a working mode at a present moment, where the working mode is selected from: a first mode in which all the bypass switches are off, a second mode in which part of the bypass switches are off while the other bypass switches are on, and a third mode in which all the bypass switches are on; and determining the mismatched parallel loss based on the determined working mode.

In an embodiment, the determining the mismatched parallel loss based on the determined working mode includes: determining a first electrical parameter curve for each of the photovoltaic cells in the first mode, where the first electrical parameter curve shows a relationship between a first current and a first voltage; determining a peak power of the photovoltaic cell based on the first electrical parameter curve; and determining the mismatched parallel loss based on the peak power.

In an embodiment, the determining the mismatched parallel loss based on the peak power includes: switching on all the bypass switches to connect the photovoltaic cells in parallel; determining a combined electrical parameter curve for the photovoltaic cells connected in parallel; determining a combined peak power based on the combined electrical parameter curve; and determining the mismatched parallel loss based on the peak power and the combined peak power.

In an embodiment, the determining the mismatched parallel loss based on the peak power and the combined peak power includes: determining the mismatched parallel loss based on the peak power and the combined peak power from a preset formula:

$$\varphi = \frac{(P_{1\text{-}max} + P_{2\text{-}max} + \cdots P_{N\text{-}max}) - P_{all\text{-}max}}{P_{all\text{-}max}}$$

where $\varphi$ represents the mismatched parallel loss, $P_{1\text{-}max}$, $P_{2\text{-}max}$ . . . . $P_{N\text{-}max}$ represent the peak powers for the respective photovoltaic cells, and $P_{all\text{-}max}$ represents the combined peak power.

In an embodiment, the determining the mismatched parallel loss based on the determined working mode includes: determining a cell current set through the photovoltaic cells connected in parallel in the second mode or the third mode; determining a second electrical parameter curve for the photovoltaic cell based on the cell current set, where the second electrical parameter curve shows a relationship between a second current and a second voltage; and determining the mismatched parallel loss based on the second electrical parameter curve.

In an embodiment, the determining the second electrical parameter curve for the photovoltaic cells based on the cell current set includes: clustering currents through the respective photovoltaic cells in the cell current set, and acquiring the number of clusters; determining a target photovoltaic cell among the photovoltaic cells if the number of clusters is greater than a preset number; switching off the bypass switch corresponding to the target photovoltaic cell, and acquiring a second current and a second voltage for the photovoltaic cells; and constructing the second electrical parameter curve for the photovoltaic cells based on the second current and the second voltage.

In an embodiment, the determining the direct-current converter efficiency loss when the photovoltaic inverter is in operation includes: acquiring a preset direct-current converter efficiency curve; determining initial direct-current converter efficiency and target direct-current converter efficiency based on the preset direct-current converter efficiency curve, where the initial direct-current converter efficiency is presented before the photovoltaic inverter is in operation, and the target direct-current converter efficiency is presented when the photovoltaic inverter is in operation; and determining the direct-current converter efficiency loss based on the initial direct-current converter efficiency and the target direct-current converter efficiency.

In an embodiment, the determining the conversion efficiency loss in the inverter circuit when the photovoltaic inverter is in operation includes: constructing an inverter circuit curve showing a relationship between an inverter circuit load factor, an inverter circuit voltage and inverter circuit efficiency; determining a target inverter circuit voltage set and a corresponding target inverter circuit load factor set for voltage perturbation; determining a target inverter circuit efficiency set based on the inverter circuit curve, the target inverter circuit voltage set and the target inverter circuit load factor set; determining a maximum alternating-current output power of the inverter circuit based on the target inverter circuit efficiency set; and determining the conversion efficiency loss in the inverter circuit based on the maximum alternating-current output power and a direct-current input power of the inverter circuit.

In an embodiment, the determining the maximum alternating-current output power of the inverter circuit based on the target inverter circuit efficiency set includes: determining a direct-current input power set corresponding to target inverter circuit voltages in the target inverter circuit voltage set; determining an alternating-current output power set based on the direct-current input power set and the target inverter circuit efficiency set; and determining the maximum alternating-current output power of the inverter circuit based on a maximum value in the alternating-current output power set.

In an embodiment, the MPPT controlling the photovoltaic inverter based on the direct-current loss and/or the conversion efficiency loss includes: determining a target working mode based on mismatched parallel loss and direct-current converter efficiency loss in the direct-current loss, and MPPT controlling the photovoltaic inverter; and/or MPPT controlling the photovoltaic inverter based on a maximum alternating-current output power in the conversion efficiency loss.

In an embodiment, the determining the target working mode based on the mismatched parallel loss and the direct-current converter efficiency loss in the direct-current loss includes: switching on the corresponding bypass switch and determining the target working mode based on states of the bypass switches, in response to the mismatched parallel loss being less than the direct-current converter efficiency loss; and switching off the corresponding bypass switch and determining the target working mode based on states of the bypass switch, in response to the mismatched parallel loss being greater than the direct-current converter efficiency loss.

To solve the above technical problem, an MPPT device is further provided according to the present disclosure. The MPPT device includes: a loss determination module and an MPPT control module. The loss determination module is configured to: determine direct-current loss when the photovoltaic inverter is in operation, where the direct-current loss indicates power loss occurring at a direct-current side of the photovoltaic inverter; and/or determine conversion efficiency loss in the inverter circuit when the photovoltaic inverter is in operation, where the conversion efficiency loss indicates power loss in the inverter circuit. The MPPT control module is configured to MPPT control the photovoltaic inverter based on the direct-current loss and/or the conversion efficiency loss.

To solve the above technical problem, a storage medium is further provided according to the present disclosure. The storage medium stores an MPPT control program that, when executed by a processor, implements steps the MPPT control method described above.

In the present disclosure, the direct-current loss occurring when the photovoltaic inverter is in operation is determined. The direct-current loss indicates power loss occurring at a direct-current side of the photovoltaic inverter. Additionally, but not necessarily, the conversion efficiency loss occurring in the inverter circuit when the photovoltaic inverter is in operation is determined. The conversion efficiency loss indicates power loss occurring in the inverter circuit. The photovoltaic inverter is MPPT controlled based on the direct-current loss and/or the conversion efficiency loss. This is because that the power loss at the direct-current side of the photovoltaic inverter and the conversion efficiency loss in the inverter circuit affect the efficiency of the photovoltaic inverter. According to the technical solution of the present disclosure, the efficiency of the photovoltaic inverter can be improved based on the direct-current loss and/or the conversion efficiency loss, thereby increasing energy yield of the photovoltaic system.

BRIEF DESCRIPTION OF THE DRAWINGS

FIG. 1 is a schematic flowchart illustrating an MPPT control method according to a first embodiment of the present disclosure;

FIG. 2 is a schematic flowchart illustrating the MPPT control method according to a second embodiment the present disclosure;

FIG. 7 is a schematic flowchart illustrating the MPPT control method according to a third embodiment of the present disclosure;

Figure 3:
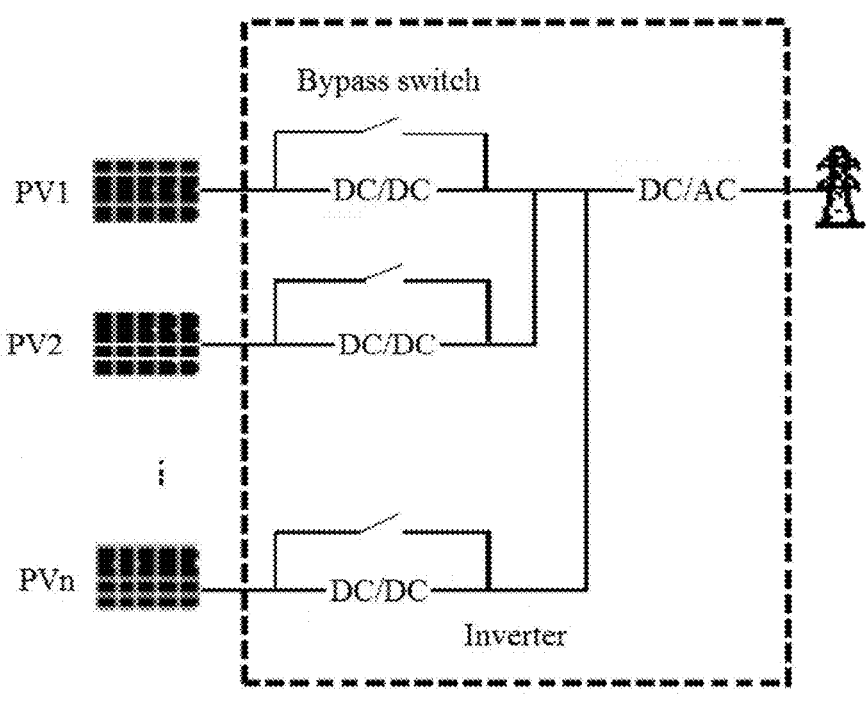
FIG. 3 is a schematic diagram illustrating a first mode in the MPPT control method according to an embodiment of the present disclosure.

The inventive purpose, features and advantages of the present disclosure are further described with reference to the drawings in combination with the embodiments.

DETAILED DESCRIPTION

It should be understood that the embodiments described herein are only used to explain the present disclosure, rather than limit the present disclosure.

An MPPT control method is provided according to an embodiment of the present disclosure. Reference is made to FIG. 1, which is a schematic flowchart illustrating the MPPT control method according to a first embodiment of the present disclosure.

In the first embodiment, the MPPT control method includes the following steps S10, S20 and S30.

In step S10, direct-current loss occurring when the photovoltaic inverter is in operation is determined. The direct-current loss indicates power loss occurring at a direct-current side of the photovoltaic inverter when the photovoltaic inverter is in operation.

It should be noted that the MPPT control method may be performed by an electronic device, for example, a computer, that can acquire data and process data. The MPPT control method is applied to a photovoltaic inverter. The photovoltaic inverter includes: an inverter circuit, and multiple direct-current conversion modules connected in parallel. Each of the direct-current conversion modules includes a direct-current conversion circuit and a bypass switch connected in parallel. An input terminal of the direct-current conversion module is connected to at least one photovoltaic cell. The inverter circuit is a direct-current to alternating-current converter and the direct-current conversion circuit is a direct-current to direct-current converter.

The photovoltaic inverter converts the direct-current power generated by the photovoltaic cell into alternating-current power and inputs the alternating current power to a power grid. The direct-current loss indicates the power loss at the direct-current side when the photovoltaic inverter is in operation, that is, the power loss between the input terminal and the output terminal of the direct-current conversion module when the photovoltaic inverter is in operation. The direct-current loss is calculated from 1-output power/input power, or in other manners.

In step S20, conversion efficiency loss occurring in the inverter circuit when the photovoltaic inverter is in operation is determined. The conversion efficiency loss indicates power loss in the inverter circuit when the photovoltaic inverter is in operation. The MPPT control method herein does not necessitate step S20.

It should be understood that the conversion efficiency loss indicates power loss in the inverter circuit when the photovoltaic inverter is in operation, that is, the power loss between the input terminal and the output terminal of the inverter circuit when the photovoltaic inverter is in operation. The conversion efficiency loss is calculated from 1-output power/input power, or in other manners.

In step S30, the photovoltaic inverter is MPPT controlled based on the direct-current loss and/or the conversion efficiency loss.

The photovoltaic inverter is MPPT controlled based on the direct-current loss and/or the conversion efficiency loss. In an embodiment, the photovoltaic inverter is MPPT controlled based on the direct-current loss, that is, the direct-current loss is reduced. In another embodiment, the photovoltaic inverter is MPPT controlled based on the conversion efficiency loss, that is, the conversion efficiency loss is reduced. In other embodiments, the photovoltaic inverter is MPPT controlled based on both the direct-current loss and the conversion efficiency loss, that is, both the direct-current loss and the conversion efficiency loss are reduced.

In the present disclosure, the direct-current loss occurring when the photovoltaic inverter is in operation is determined. The direct-current loss indicates power loss occurring at a direct-current side of the photovoltaic inverter. Additionally, but not necessarily, the conversion efficiency loss occurring in the inverter circuit when the photovoltaic inverter is in operation is determined. The conversion efficiency loss indicates power loss occurring in the inverter circuit. The photovoltaic inverter is MPPT controlled based on the direct-current loss and/or the conversion efficiency loss. This is because that the power loss at the direct-current side of the photovoltaic inverter and the conversion efficiency loss in the inverter circuit affect the efficiency of the photovoltaic inverter. According to the technical solution of the present disclosure, the efficiency of the photovoltaic inverter can be improved based on the direct-current loss and/or the conversion efficiency loss, thereby increasing energy yield of the photovoltaic system.

Reference is made to FIG. 2, which is a schematic flowchart illustrating the MPPT control method according to a second embodiment of the present disclosure.

The step S10 includes the following step S101 and step S102 based on the first embodiment.

In step S101, mismatched parallel loss occurring when the photovoltaic inverter is in operation is determined. The mismatched parallel loss indicates power loss occurring when the photovoltaic cells are connected in parallel.

The mismatched parallel loss indicates the power loss occurring when the photovoltaic cells are connected in parallel. The photovoltaic cells are different in voltage at their respective maximum power points, but necessarily operate at the same voltage (depending on a maximum power point of a subsystem composed of the photovoltaic cells connected in parallel) after connected in parallel. That is, the photovoltaic cells fail to operate at their respective maximum power points, and therefore energy loss results, that is, the resulting mismatched parallel loss.

In some embodiments, the step S101 includes: determining a working mode at a present moment, where the working mode is selected from: a first mode in which all the bypass switches are off, a second mode in which part of the bypass switches are off while the other bypass switches are on, and a third mode in which all the bypass switches are on; and determining the mismatched parallel loss based on the determined working mode.

It should be understood that the working mode in the present embodiment is one of the first mode, the second mode and the third mode. Reference is made to FIG. 3, which is a schematic diagram illustrating the first mode in the MPPT control method according to an embodiment of the present disclosure. As shown in FIG. 3, the photovoltaic inverter includes n combinations of a bypass switch and a direct-current conversion circuit, that is, the DC/DC circuit. The bypass switch is connected in parallel with the direct-current conversion circuit. The photovoltaic inverter also includes an inverter circuit, that is, the DC/AC circuit. PV1, PV2 . . . , PVn represent n photovoltaic cells. The n photovoltaic cells are connected to the n combinations respectively. In the first mode, all the bypass switches are off, all the photovoltaic cells are connected in series, and all the DC/DC circuits work at respective maximum power points. That is, all the photovoltaic cells each output the maximum power.

Figure 4:
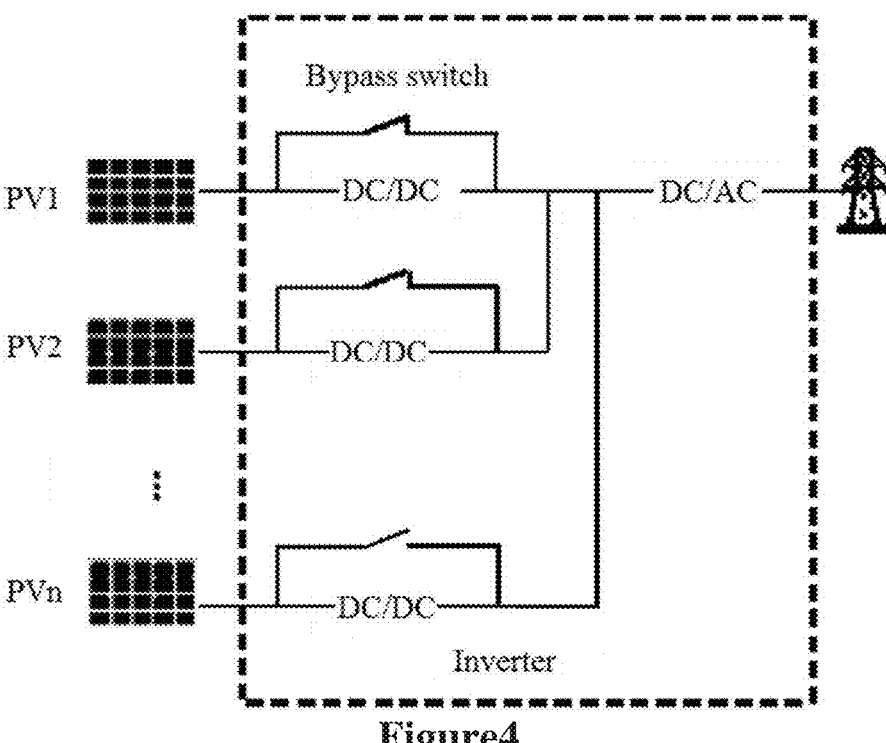
FIG. 4 is a schematic diagram illustrating a second mode in the MPPT control method according to an embodiment of the present disclosure.

Reference is made to FIG. 4, which is a schematic diagram illustrating the second mode in the MPPT control method according to an embodiment of the present disclosure. As shown in FIG. 4, in the second mode, some bypass switches are off, and the remaining bypass switches are on. The number of bypass switches that are off is not limited thereto. In the second mode, some DC/DC circuits work at respective maximum power points to reduce the mismatched parallel loss. Other DC/DC circuits do not work, to reduce the efficiency loss of the direct-current converter.

Figure 5:
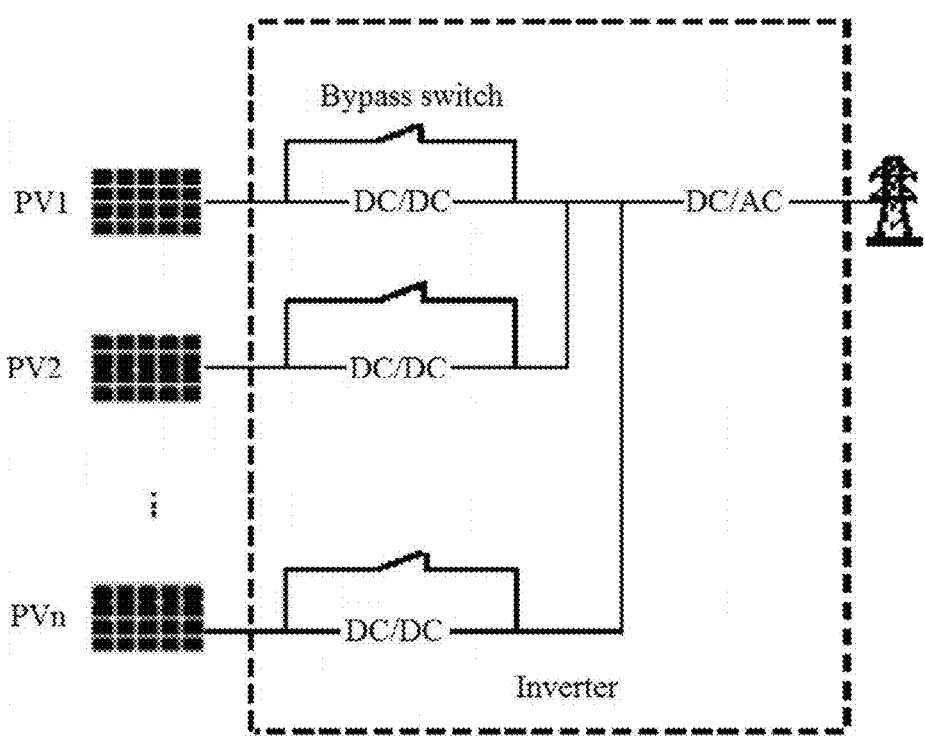
FIG. 5 is a schematic diagram illustrating a third mode in the MPPT control method according to an embodiment of the present disclosure.

Reference is made to FIG. 5, which is a schematic diagram illustrating the third mode in the MPPT control method according to an embodiment of the present disclosure. As shown in FIG. 5, in the third mode, all the bypass switches are off, all the photovoltaic cells under are connected in parallel, and all the DC/DC circuits are bypassed, that is, all the DC/DC circuits do not work, thereby reducing the efficiency loss in the direct-current converter.

The determination of the mismatched parallel loss varies with the modes. The mismatched parallel loss is determined according to the working mode at the present moment.

Further, in order to accurately determine the mismatched parallel loss in the first mode, the determining the mismatched parallel loss based on the present working mode includes: determining a first electrical parameter curve for each of the photovoltaic cells in the first mode, where the first electrical parameter curve shows a relationship between a first current and a first voltage; determining a peak power of the photovoltaic cell based on the first electrical parameter curve; and determining the mismatched parallel loss based on the peak power.

Figure 6:
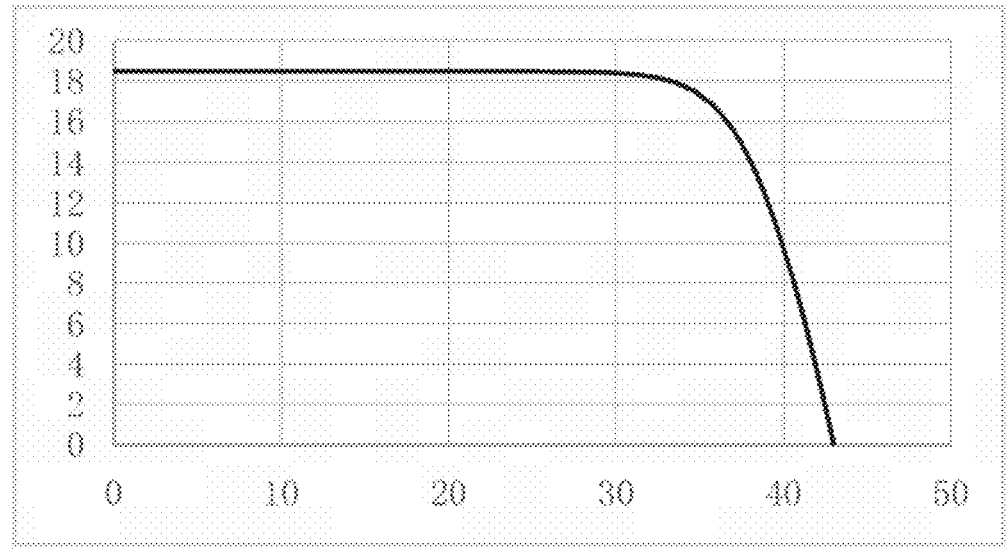
FIG. 6 is a schematic diagram illustrating a first electrical parameter curve for the MPPT control method according to an embodiment of the present disclosure.

In the first mode, all the photovoltaic cells are connected in series. For each of the photovoltaic cells, a first electrical parameter curve is determined. For example, the first electrical parameter curve shows the relationship between the first current and the first voltage of the photovoltaic cell. Reference is made to FIG. 6, which is a schematic diagram illustrating the first electrical parameter curve in the MPPT control method according to an embodiment of the present disclosure. In FIG. 6, the vertical axis represents the first current, and the horizontal axis represents the first voltage. FIG. 6 shows only an example of the first electrical parameter curve. The present embodiment does not impose restrictions on the first current and the first voltage on the first electrical parameter curve.

The peak power of the photovoltaic cell refers to a maximum power among products of the first current and the first voltage of the photovoltaic cell. Then, the mismatched parallel loss occurring when the photovoltaic inverter is in operation is determined according to the peak power.

Furthermore, the determining the mismatched parallel loss based on the peak power includes: switching on all the bypass switches to connect the photovoltaic cells in parallel;

determining a combined electrical parameter curve for the photovoltaic cells connected in parallel; determining a combined peak power based on the combined electrical parameter curve; and determining the mismatched parallel loss based on the peak power and the combined peak power.

After the peak power of the photovoltaic cell is acquired, all the bypass switches in the photovoltaic inverter are switched on. Therefore, all the photovoltaic cells are connected in parallel. The photovoltaic cells share the same voltage and adds the currents together, for generating the combined electrical parameter curve. The vertical axis represents the total current, and the horizontal axis represents the voltage. The combined electrical parameter curve also corresponds to a combined peak power, that is, the maximum among the products of the combined current and the voltage on the combined electrical parameter curve.

Furthermore, the determining the mismatched parallel loss based on the peak power and the combined peak power includes:

determining the mismatched parallel loss based on the peak power and the combined peak power from a preset formula:

$$\varphi = \frac{(P_{1-max} + P_{2-max} + \cdots P_{N-max}) - P_{all-max}}{P_{all-max}}$$

where $\varphi$ represents the mismatched parallel loss, $P_{1-max}$, $P_{2-max}$ . . . . $P_{N-max}$ represent the peak powers for the respective photovoltaic cells, and $P_{all-max}$ represents the combined peak power.

In the embodiments, the mismatched parallel loss $\varphi$ is calculated from the preset formula.

Furthermore, in order to accurately determine the mismatched parallel loss in the second mode or the third mode, the determining the mismatched parallel loss based on the determined working mode includes: determining a cell current set through the photovoltaic cells connected in parallel in the second mode or the third mode; determining a second electrical parameter curve for the photovoltaic cell based on the cell current set, where the second electrical parameter curve shows a relationship between a second current and a second voltage; and determining the mismatched parallel loss based on the second electrical parameter curve.

In the second mode or the third mode, some photovoltaic cells are connected in parallel. The cell current set for the photovoltaic cells connected in parallel is determined. That is, the sum of currents through the respective photovoltaic cells connected in parallel is acquired. The second electrical parameter curve is determined according to the cell current set. The second electrical parameter curve shows the relationship between the second current and the second voltage. The second current is the sum of currents through the respective photovoltaic cells connected in parallel. The second voltage is the voltage across the photovoltaic cells connected in parallel. The mismatched parallel loss is determined according to the second electrical parameter curve. For details, reference is made to the determining the mismatched parallel loss according to the curve between the first current and the first voltage.

Furthermore, in order to effectively construct the second electrical parameter curve, the determining the second electrical parameter curve for the photovoltaic cells based on the cell current set includes: clustering currents through the respective photovoltaic cells in the cell current set, and acquiring the number of clusters; determining a target photovoltaic cell among the photovoltaic cells if the number of clusters is greater than a preset number; switching off the bypass switch corresponding to the target photovoltaic cell, and acquiring a second current and a second voltage for the photovoltaic cells; and constructing the second electrical parameter curve for the photovoltaic cells based on the second current and the second voltage.

In the second mode or the third mode, some photovoltaic cells are connected in parallel. The photovoltaic cells connected in parallel are determined, and currents through the respective photovoltaic cells connected in parallel are determined, forming the cell current set. The currents in the cell current set are subjected to clustering to obtain multiple clusters, and then the number of clusters is obtained.

In an embodiment, the preset number is set to 1. The fact that the clusters are more than 1 indicates that the cell currents are significantly different. In view of this, a target photovoltaic cell is determined from the photovoltaic cells connected in parallel, and then the bypass switch connected to the target photovoltaic cell is switched off. The voltages and currents of the photovoltaic cell are collected in real time, and then the second electrical parameter curve is obtained based on the voltages, that is, the second voltage, and the currents, that is, the second current.

The fact that the number of the clusters is equal to 1 indicates that the cell currents are relatively similar to each other. Then, the bypass switch corresponding to the target photovoltaic cell is switched on, so that the photovoltaic inverter works in the third mode.

In step S102, the direct-current converter efficiency loss occurring when the photovoltaic inverter is in operation is determined. The direct-current converter efficiency loss indicates power loss occurring in the direct-current conversion circuit when the photovoltaic inverter is in operation.

It should be understood that the direct-current converter efficiency loss indicates the power loss in the direct-current conversion circuit when the photovoltaic inverter is in operation, that is, loss in components in the direct-current conversion circuit.

Furthermore, in order to effectively determine the direct-current converter efficiency loss, the step S102 includes: acquiring a preset direct-current converter efficiency curve; determining initial direct-current converter efficiency and target direct-current converter efficiency based on the preset direct-current converter efficiency curve, where the initial direct-current converter efficiency is presented before the photovoltaic inverter is in operation, and the target direct-current converter efficiency is presented when the photovoltaic inverter is in operation; and determining the direct-current converter efficiency loss based on the initial direct-current converter efficiency and the target direct-current converter efficiency.

It should be noted that the preset direct-current converter efficiency curve may be acquired from the manufacturer, and may be constructed before the direct-current converter leaves the factory.

The preset direct-current converter efficiency curve shows the efficiency with variable voltage, the efficiency with a variable boost ratio, the efficiency with a variable load factor, and the like. The preset direct-current converter efficiency curve is constructed by curve fitting based on the measured data. Therefore, the direct-current converter efficiency loss corresponding to the inverter is determined according to the preset direct-current converter efficiency curve. The initial direct-current converter efficiency before the photovoltaic inverter is in operation is determined according to the preset direct-current converter efficiency curve, and the target direct-current converter efficiency when the photovoltaic inverter is in operation is also determined according to the preset direct-current converter efficiency curve. The difference between the initial direct-current converter efficiency and the target direct-current converter efficiency is determined as the direct-current converter efficiency loss.

In the embodiments, the direct-current loss indicates power loss occurring at the direct-current side of the photovoltaic inverter. The direct-current loss includes the mismatched parallel loss and the direct-current converter efficiency loss. The mismatched parallel loss indicates power loss occurring when the photovoltaic cells are connected in parallel. The direct-current converter efficiency loss indicates power loss in the direct-current conversion circuit. Therefore, the power loss occurring at the direct-current side of the photovoltaic inverter can be acquired based on the mismatched parallel loss and the direct-current converter efficiency loss.

Reference is made to FIG. 7, which is a schematic flowchart illustrating the MPPT control method according to a third embodiment of the present disclosure.

The step S20 includes the following step S201 to step S205 based on the first embodiment.

In step S201, an inverter circuit curve is pre-constructed. The inverter circuit curve shows a relationship among an inverter circuit load factor, an inverter circuit voltage and inverter circuit efficiency.

Figure 8:
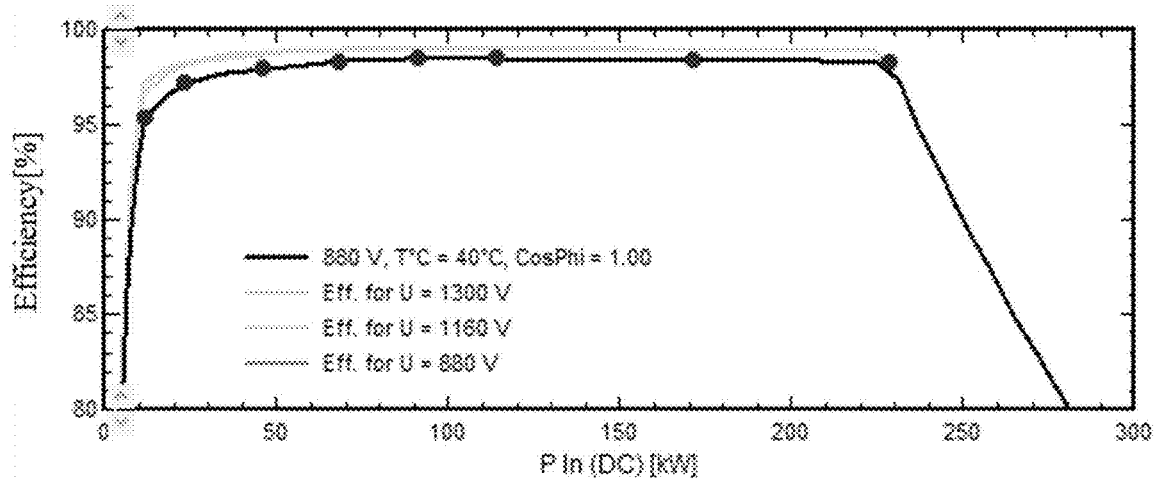
FIG. 8 is a schematic diagram illustrating an inverter circuit curve for the MPPT control method according to an embodiment of the present disclosure.

The existing hill climbing and perturbation and observation aim to find the voltage at the maximum power point. However, the maximum power at the direct-current side of the inverter circuit does not necessarily result maximum output power at the alternating-current side of the inverter circuit due to the influence of the load factor of the inverter circuit, the voltage across the inverter circuit and the efficiency of the inverter circuit. In the present embodiment, the inverter circuit curve showing the relationship between the load factor of the inverter circuit, the voltage across the inverter circuit and the efficiency of the inverter circuit is constructed. Reference is made to FIG. 8, which is a schematic diagram illustrating the inverter circuit curve in the MPPT control method according to an embodiment of the present disclosure. As shown in FIG. 8, the vertical axis represents the inverter circuit efficiency, the horizontal axis represents the inverter circuit load factor, and the four curves represent the relationship between the load factor and the efficiency in four voltages, namely, 880V, 1300V, 1160V and 880V.

In step S202, a target inverter circuit voltage set and a corresponding target inverter circuit load factor for voltage perturbation are determined.

It should be understood that the target inverter circuit voltage refers to the voltage of the inverter circuit for perturbation as the MPPT. The inverter circuit voltage may have various values, thus constituting the target inverter circuit voltage set. The target inverter circuit load factor refers to the load factor of the inverter circuit under the values of the voltage, to construct the target inverter circuit load factor set.

In step S203, a target inverter circuit efficiency set is determined based on the inverter circuit curve, the target inverter circuit voltage set and the target inverter circuit load factor set.

Since the inverter circuit curve can represent the relationship between the inverter circuit voltage, the inverter circuit load factor and the inverter circuit efficiency, values of the target inverter circuit efficiency corresponding to different values of the target inverter voltages and different values of target inverter circuit load factors can be determined according to the inverter circuit curve, so that the target inverter circuit efficiency set is constructed.

In step S204, a maximum alternating-current output power of the inverter circuit is determined based on the target inverter circuit efficiency set.

It should be noted that the maximum alternating-current output power of the inverter circuit is acquired by multiplying the efficiency of the inverter circuit by the direct-current input power.

Furthermore, in order to accurately acquire the maximum alternating-current output power, the step S204 includes: determining a direct-current input power set corresponding to target inverter circuit voltages in the target inverter circuit voltage set; determining an alternating-current output power set based on the direct-current input power set and the target inverter circuit efficiency set; and determining the maximum alternating-current output power of the inverter circuit based on a maximum value in the alternating-current output power set.

It should be understood that the direct-current input power under different target inverter circuit voltages is acquired, and is multiplied by the target inverter circuit efficiency to obtain the alternating-current output power and thence the alternating-current output power set. The maximum in the alternating-current output power set is the maximum alternating-current output power.

In an embodiment, the transformer is involved. When determining the target inverter load factor under the different target inverter voltages, transformer efficiency is determined, forming a transformer efficiency set. The direct-current input power is multiplied by the inverter circuit efficiency and then by the transformer efficiency, to obtain the alternating-current output power, forming the alternating-current output power set.

In step S205, the conversion efficiency loss in the inverter circuit when the photovoltaic inverter is in operation is determined based on the maximum alternating-current output power and direct-current input power of the inverter circuit.

The conversion efficiency loss in the inverter circuit is obtained from 1-max alternating-current output power/direct-current input power.

The inverter circuit curve is constructed. The inverter circuit curve shows a relationship between the load factor of the inverter circuit, the voltage across the inverter circuit and the efficiency of the inverter circuit. Then, the target inverter circuit voltage set and the corresponding target inverter circuit load factor set for voltage perturbation are determined. The target inverter circuit efficiency set is determined based on the inverter circuit curve, the target inverter circuit voltage set and the target inverter circuit load factor set. The maximum alternating-current output power of the inverter circuit is determined based on the target inverter circuit efficiency set. The conversion efficiency loss in the inverter circuit when the photovoltaic inverter is in operation is determined based on the maximum alternating-current output power and the direct-current input power of the inverter circuit. In the embodiment, the photovoltaic inverter is MPPT controlled according to the maximum alternating-current output power, thereby reducing the loss in the inverter circuit. Therefore, the efficiency of the photovoltaic inverter can be improved, thereby increasing the energy yield of the photovoltaic system.

Furthermore, in order to effectively MPPT control the photovoltaic inverter, the step S30 includes: determining a target working mode based on mismatched parallel loss and direct-current converter efficiency loss in the direct-current loss, and MPPT controlling the photovoltaic inverter; and/or MPPT controlling the photovoltaic inverter based on a maximum alternating-current output power in the conversion efficiency loss.

It should be understood that the target working mode is also selected from the first mode, the second mode or the third mode. That is, the photovoltaic inverter is switched to the target working mode and then is MPPT controlled in the target working mode. Additionally, but not necessarily, the photovoltaic inverter is MPPT controlled based on the maximum alternating-current output power, that is, to regulate the alternating-current output power of the inverter circuit in the photovoltaic inverter to approximate the maximum alternating-current output power.

In an embodiment, the photovoltaic inverter is MPPT controlled based on the target working mode. In another embodiment, the photovoltaic inverter is MPPT controlled based on the maximum alternating-current output power. In other embodiments, the photovoltaic inverter is MPPT controlled based on both the target working mode and the maximum alternating-current output power.

Furthermore, in order to effectively determine the target working mode, the determining the target working mode based on the mismatched parallel loss and the direct-current converter efficiency loss of the direct-current loss includes: switching on the corresponding bypass switch and determining the target working mode based on states of the bypass switches, in response to the mismatched parallel loss being less than the direct-current converter efficiency loss; and switching off the corresponding bypass switch and determining the target working mode based on states of the bypass switch, in response to the mismatched parallel loss being greater than the direct-current converter efficiency loss.

It should be understood that when the mismatched parallel loss being less than the direct-current converter loss indicates that the power loss occurring when the photovoltaic cells are connected in parallel is small, and then the corresponding bypass switch is switched on. The target working mode is determined according to the states of the bypass switches. The DC/DC circuit stops working, the photovoltaic cells connected in parallel still operates at the same MPP. The mismatched parallel loss being greater than the direct-current converter efficiency loss indicates that the power loss occurring in the direct-current converter is small, then the corresponding bypass switch is switched off. The target working mode is determined according to the states of the bypass switches. Therefore, whether to switch on or off the bypass switch depends on comparison between the mismatched parallel loss and the direct-current converter efficiency loss. The target working mode is determined according to the states of the bypass switches.

In practice, the working mode is changed after the mismatched parallel loss and the direct-current converter efficiency loss are obtained. The mismatched parallel loss being greater than the direct-current converter efficiency loss indicates that the power loss occurring in the direct-current converter is small, then the direct-current converter still works. The photovoltaic inverter is currently switched to the first mode. The mismatched parallel loss being less than the direct-current converter efficiency loss indicates that the power loss occurring when the photovoltaic cells are connected in parallel is small, then the photovoltaic cells are connected in parallel. The photovoltaic inverter is currently switched to the third mode. If the mismatched parallel loss occurring when some photovoltaic cells are connected in parallel is less than the direct-current converter efficiency loss, then the bypass switches corresponding to these photovoltaic cells are off. The photovoltaic inverter is currently switched to the second mode.

In practice, reference is made to table 1, which shows the change in efficiency from the third mode to the first mode. It can be seen that the overall efficiency is increased by 5.9%.

TABLE 1

| Third mode | First mode |
| --- | --- |
| Mppt efficiency: 92% | Mppt efficiency: 99.9% |
| DC/DC efficiency: 100% | DC/DC efficiency: 98% |
| Overall efficiency: 92% | Overall efficiency: 97.9% |

Figure 9:
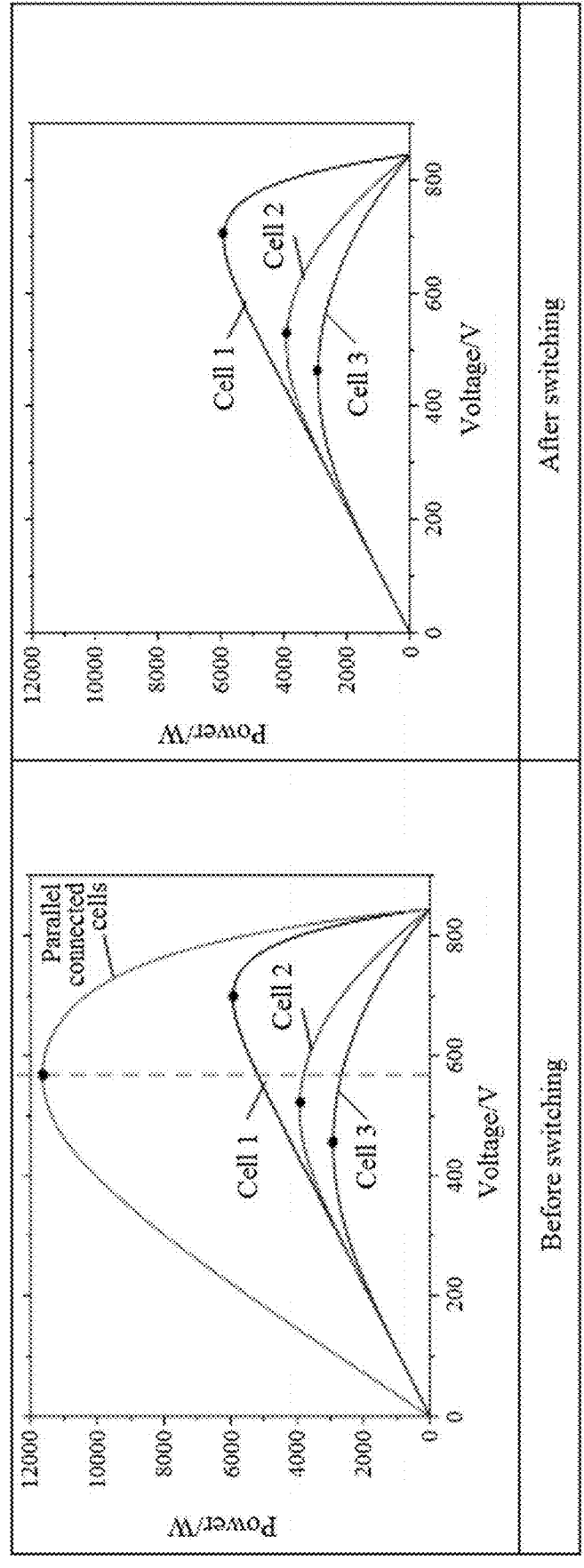
FIG. 9 is a schematic diagram illustrating comparison between the third mode and the subsequent first mode in the MPPT control method according to an embodiment of the present disclosure.

Reference is made to FIG. 9, which is a schematic diagram illustrating comparison between the third mode and the subsequent first mode in the MPPT control method according to an embodiment of the present disclosure. As shown in FIG. 9, the vertical axis represents power, and the horizontal axis represents voltage. In the third mode, the three photovoltaic cells 1, 2 and 3 operate at respective MPPs that are significantly different from each other, and therefore are no longer suitable to be connected in parallel. In this case, the photovoltaic inverter is switched to the first mode.

In practice, reference is made to table 2, which shows the change in efficiency from the third mode to the second mode. It can be seen that the overall efficiency is increased by 2.5%.

TABLE 2

| Third mode | Second mode |
| --- | --- |
| Mppt efficiency: 96% | Mppt efficiency: 99.2% |
| DC/DC efficiency: 100% | DC/DC efficiency: 99.3% |
| Overall efficiency: 96% | Overall efficiency: 98.5% |

Figure 10:
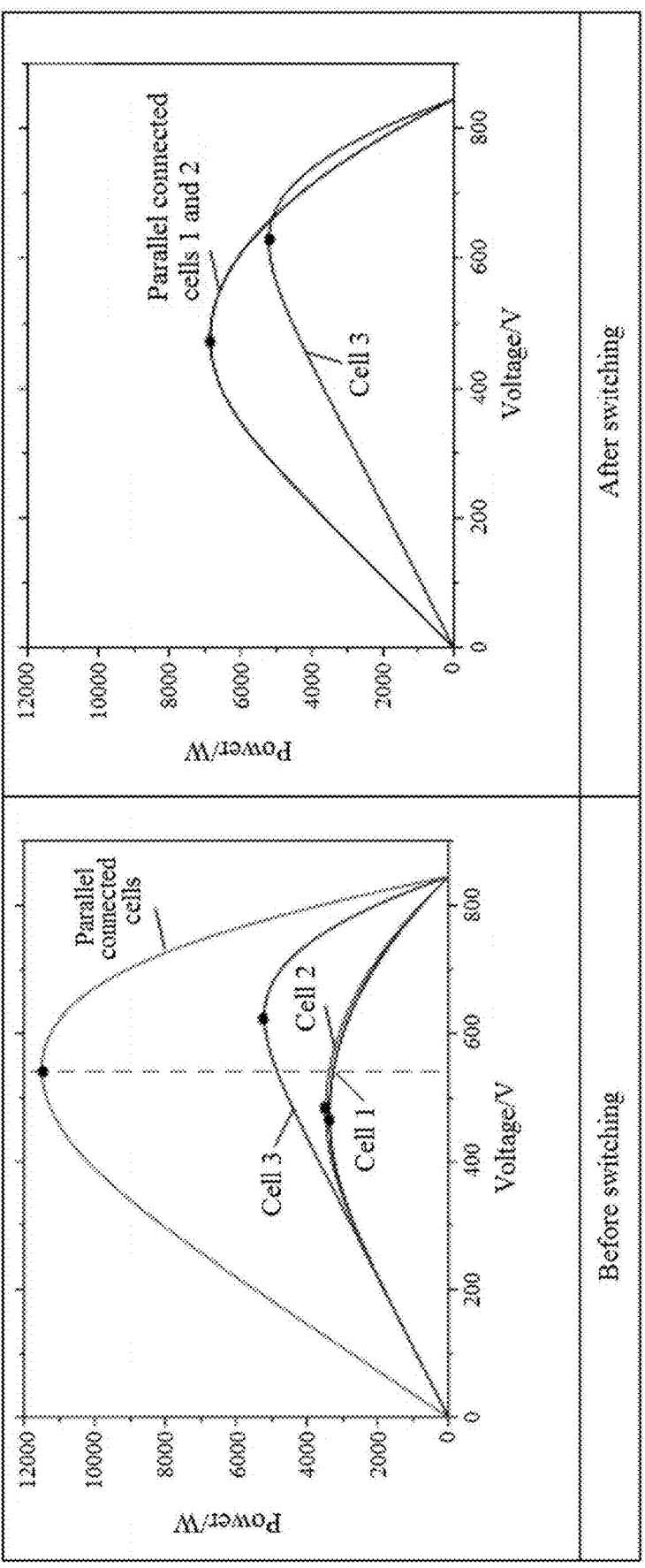
FIG. 10 is a schematic diagram illustrating comparison between the third mode and the subsequent second mode in the MPPT control method according to an embodiment of the present disclosure.

Reference is made to FIG. 10, which is a schematic diagram illustrating comparison between the third mode and the subsequent second mode in the MPPT control method according to an embodiment of the present disclosure. As shown in FIG. 10, the vertical axis represents power, and horizontal axis represents the voltage. In the third mode, the photovoltaic cells 1 and 2 operate at respective MPPs that are similar, and therefore are suitable to be connected in parallel. However, the photovoltaic cell 3 operates at a significantly different MPP, and therefore is no longer suitable to be connected in parallel with the photovoltaic cells 1 and 2. In this case, the photovoltaic inverter is switched to the second mode.

In practice, reference is made to table 3, which shows the change in efficiency from the first mode to the third mode. It can be seen that the overall efficiency is increased by 1.3%.

TABLE 3

| First mode | Third mode |
| --- | --- |
| Mppt efficiency: 99.9% | Mppt efficiency: 99.2% |
| DC/DC efficiency: 98% | DC/DC efficiency: 100% |
| Overall efficiency: 97.9% | Overall efficiency: 99.2% |

Figure 11:
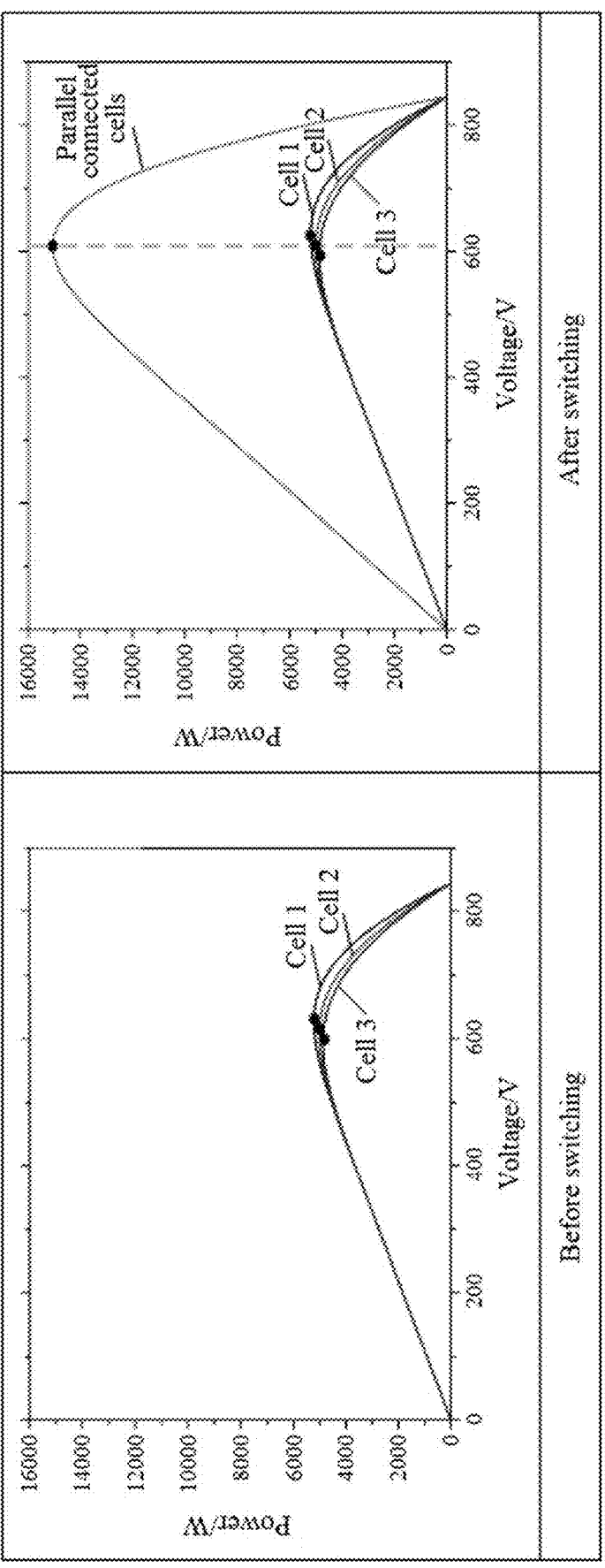
FIG. 11 is a schematic diagram illustrating comparison between the first mode and the subsequent third mode in the MPPT control method according to an embodiment of the present disclosure.

Reference is made to FIG. 11, which is a schematic diagram illustrating comparison between the first mode and the subsequent third mode in the MPPT control method according to an embodiment of the present disclosure. As shown in FIG. 11, the vertical axis represents power, and the horizontal axis represents voltage. In the first mode, the three photovoltaic cells 1, 2 and 3 operate at respective MPPs that are similar to each other, and therefore are suitable to be connected in parallel. In this case, the photovoltaic inverter is switched to the third mode.

All the parameters in the above three examples are illustrative. it can be seen that the overall efficiency of the photovoltaic inverter can be improved and the energy yield of the photovoltaic system can be increased by switching between the working modes.

In the present disclosure, both the direct-current loss and the conversion efficiency loss are considered, the photovoltaic cells in a photovoltaic array output voltages that are more similar, and the annual energy yield is increased. However, the existing solution focuses on the MPPT only and fails to consider the inverter efficiency at different voltages, resulting in lower annual energy yield. Table 4 shows the comparison between the proposed solution and the existing solution in the annual array energy yield, the annual array energy yield gain, the annual energy yield and the system efficiency. It can be seen that both the annual energy yield and the system efficiency with the proposed solution are significantly increased by comparison with the existing solution.

TABLE 4

| Schemes | Proposed solution | Existing solution |
| --- | --- | --- |
| Annual array energy yield (kWh/y) | 13577.00 | 13589.00 |
| Annual array energy yield gain (%) | 1.94% | 2.03% |
| Annual energy yield (kWh/y) | 13289.9 | 13264.13 |
| System efficiency | 80.68% | 80.52% |

Figure 12A:
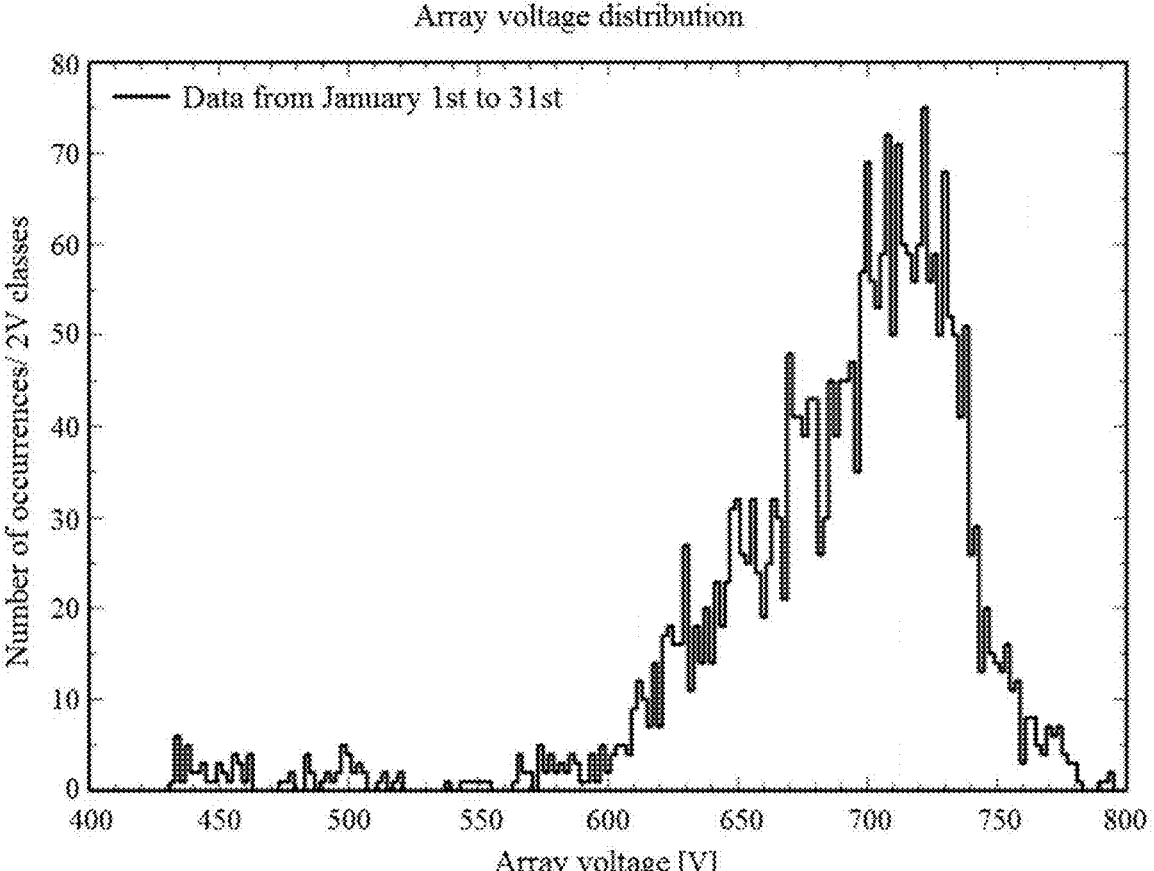
FIGS. 12(*a*) and 12(*b*) are schematic diagrams illustrating comparison between the proposed solution and the existing solution in voltage distribution in an array.
Figure 12B:
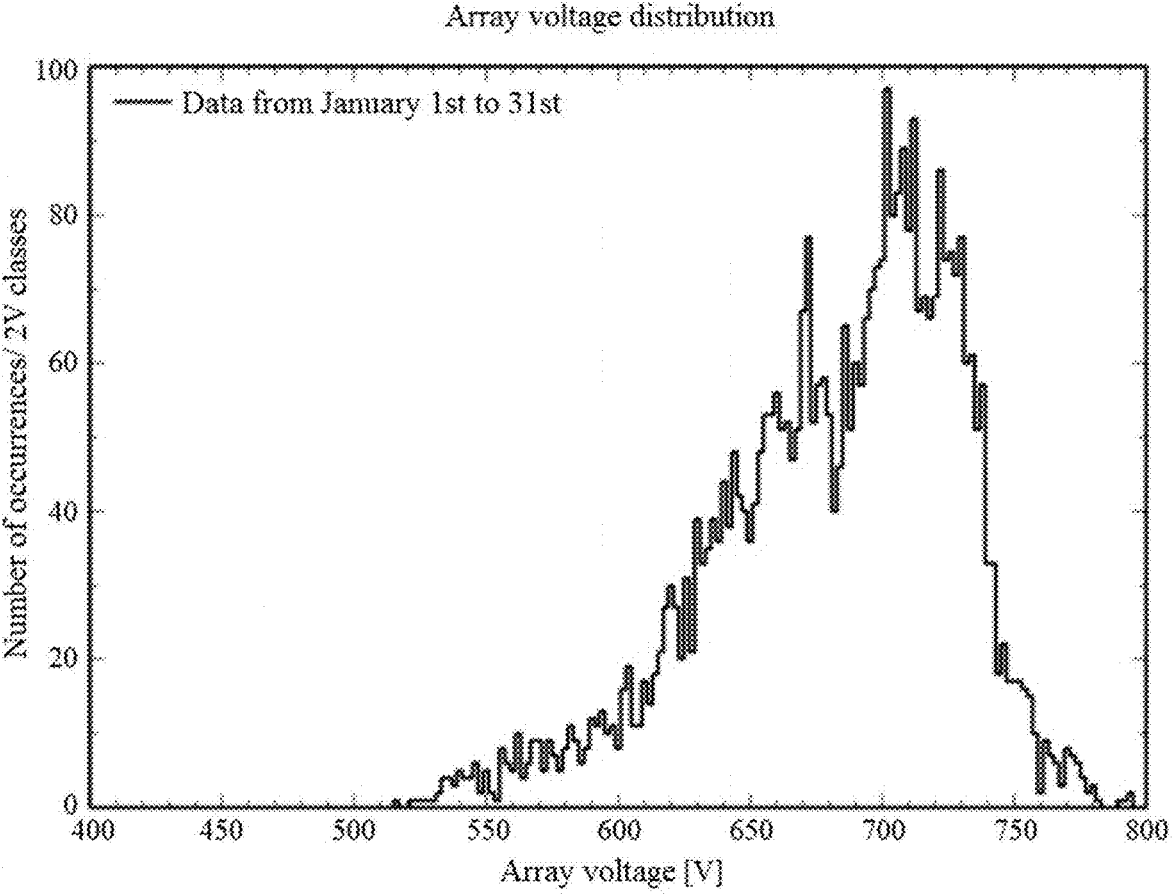

FIGS. 12(*a*) and 12(*b*) illustrate comparison between the proposed solution and the existing solution in voltage distribution in an array. It can be seen that the voltages in the array with the proposed solution are distributed more concentratedly by comparison with the existing solution.

In some embodiments, the target working mode is determined based on the mismatched parallel loss and the direct-current converter efficiency loss in the direct-current loss, and then the photovoltaic inverter is MPPT controlled. In other embodiments, the photovoltaic inverter is MPPT controlled based on the maximum alternating-current output power in the conversion efficiency loss, for decreasing loss in the photovoltaic inverter. Therefore, the efficiency of the photovoltaic inverter can be improved and then the energy yield of the photovoltaic system can be increased.

Figure 13:
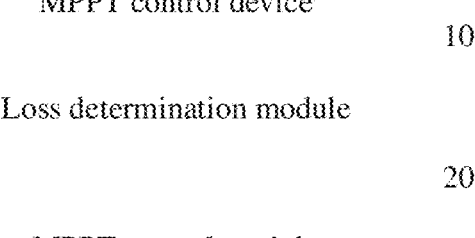
FIG. 13 is a structural block diagram illustrating an MPPT control device according to a first embodiment of the present disclosure.

Reference is made to FIG. 13, which is a structural block diagram illustrating an MPPT control device according to a first embodiment of the present disclosure.

As shown in FIG. 13, the MPPT control device according to the embodiment of the present disclosure includes: a loss determination module 10 and an MPPT control module 20.

The loss determination module 10 is configured to determine direct-current loss when the photovoltaic inverter is in operation, where the direct-current loss indicates power loss occurring at a direct-current side of the photovoltaic inverter; and/or determine conversion efficiency loss in the inverter circuit when the photovoltaic inverter is in operation, where the conversion efficiency loss indicates power loss in the inverter circuit.

The MPPT control module 20 is configured to MPPT control the photovoltaic inverter based on the direct-current loss and/or the conversion efficiency loss.

In this embodiment, the direct-current loss occurring when the photovoltaic inverter is in operation is determined. The direct-current loss indicates power loss occurring at a direct-current side of the photovoltaic inverter. Additionally, but not necessarily, the conversion efficiency loss occurring in the inverter circuit when the photovoltaic inverter is in operation is determined. The conversion efficiency loss indicates power loss occurring in the inverter circuit. The photovoltaic inverter is MPPT controlled based on the direct-current loss and/or the conversion efficiency loss. This is because the power loss at the direct-current side of the photovoltaic inverter and the conversion efficiency loss in the inverter circuit affect the efficiency of the photovoltaic inverter. According to the technical solution of the present disclosure, the efficiency of the photovoltaic inverter can be improved based on the direct-current loss and/or the conversion efficiency loss, thereby increasing energy yield of the photovoltaic system.

It should be noted that only illustrative flowcharts are described in the foregoing, which never constitutes a limitation on the protection scope of the present disclosure. In practical application, those skilled in the art can choose part or all of the steps to achieve the purpose of the present embodiment, and there is no restriction herein.

In addition, for technical details not described in detail in this embodiment, reference can be made to the MPPT control method in the foregoing embodiments of the present disclosure.

Based on the first embodiment of the MPPT control device provided according to the present disclosure, a second embodiment of the MPPT control device is proposed.

In the second embodiment, the direct-current loss includes: mismatched parallel loss and direct-current converter efficiency loss. The loss determination module 10 is further configured to: determine the mismatched parallel loss when the photovoltaic inverter is in operation, where the mismatched parallel loss indicates power loss occurring when the photovoltaic cells are connected in parallel; and determine the direct-current converter efficiency loss when the photovoltaic inverter is in operation, where the direct-current converter efficiency loss indicates power loss in the direct-current conversion circuit.

Furthermore, the loss determination module 10 is configured to: determine a working mode at a present moment, where the working mode is selected from: a first mode in which all the bypass switches are off, a second mode in which part of the bypass switches are off while the other bypass switches are on, and a third mode in which all the bypass switches are on; and determine the mismatched parallel loss based on the determined working mode.

Furthermore, the loss determination module 10 is configured to: determine a first electrical parameter curve for each of the photovoltaic cells in the first mode, where the first electrical parameter curve shows a relationship between a first current and a first voltage; determine a peak power of the photovoltaic cell based on the first electrical parameter curve; and determine the mismatched parallel loss based on the peak power.

Furthermore, the loss determination module 10 is configured to: switch on all the bypass switches to connect the photovoltaic cells in parallel; determine a combined electrical parameter curve for the photovoltaic cells connected in parallel; determine a combined peak power based on the combined electrical parameter curve; and determine the mismatched parallel loss based on the peak power and the combined peak power.

Furthermore, the loss determination module 10 is configured to: determine the mismatched parallel loss based on the peak power and the combined peak power from a preset formula:

$$\varphi = \frac{(P_{1-max} + P_{2-max} + \cdots P_{N-max}) - P_{all-max}}{P_{all-max}}$$

where $\varphi$ represents the mismatched parallel loss, $P_{1-max}$, $P_{2-max} \ldots P_{N-max}$ represent the peak powers for the respective photovoltaic cells, and $P_{all-max}$ represents the combined peak power.

Furthermore, the loss determination module 10 is configured to: determine a cell current set through the photovoltaic cells connected in parallel in the second mode or the third mode; determine a second electrical parameter curve for the photovoltaic cell based on the cell current set, where the second electrical parameter curve shows a relationship between a second current and a second voltage; and determine the mismatched parallel loss based on the second electrical parameter curve.

Furthermore, the loss determination module 10 is configured to: perform clustering om currents through the respective photovoltaic cells in the cell current set, and acquire the number of clusters; determine a target photovoltaic cell among the photovoltaic cells if the number of clusters is greater than a preset number; switch off the bypass switch corresponding to the target photovoltaic cell, and acquire a second current and a second voltage for the photovoltaic cells; and construct the second electrical parameter curve for the photovoltaic cells based on the second current and the second voltage.

Furthermore, the loss determination module 10 is configured to: acquire a preset direct-current converter efficiency curve; determine initial direct-current converter efficiency and target direct-current converter efficiency based on the preset direct-current converter efficiency curve, where the initial direct-current converter efficiency is presented before the photovoltaic inverter is in operation, and the target direct-current converter efficiency is presented when the photovoltaic inverter is in operation; and determine the direct-current converter efficiency loss based on the initial direct-current converter efficiency and the target direct-current converter efficiency.

Furthermore, the loss determination module 10 is configured to: construct an inverter circuit curve showing a relationship between an inverter circuit load factor, an inverter circuit voltage and inverter circuit efficiency; determine a target inverter circuit voltage set and a corresponding target inverter circuit load factor set for voltage perturbation; determine a target inverter circuit efficiency set based on the inverter circuit curve, the target inverter circuit voltage set and the target inverter circuit load factor set; determine a maximum alternating-current output power of the inverter circuit based on the target inverter circuit efficiency set; and determine the conversion efficiency loss in the inverter circuit based on the maximum alternating-current output power and a direct-current input power of the inverter circuit.

Furthermore, the loss determination module 10 is configured to: determine a direct-current input power set corresponding to target inverter circuit voltages in the target inverter circuit voltage set; determine an alternating-current output power set based on the direct-current input power set and the target inverter circuit efficiency set; and determine the maximum alternating-current output power of the inverter circuit based on a maximum value in the alternating-current output power set.

Furthermore, the MPPT control module 20 is configured to: determine a target working mode based on mismatched parallel loss and direct-current converter efficiency loss in the direct-current loss, and MPPT control the photovoltaic inverter; and/or MPPT controlling the photovoltaic inverter based on a maximum alternating-current output power in the conversion efficiency loss.

Furthermore, the MPPT control module 20 is configured to: switch on the corresponding bypass switch and determining the target working mode based on states of the bypass switches, in response to the mismatched parallel loss being less than the direct-current converter efficiency loss; and switch off the corresponding bypass switch and determining the target working mode based on states of the bypass switch, in response to the mismatched parallel loss being greater than the direct-current converter efficiency loss.

For other embodiments of the MPPT control device provided according to the present disclosure, dereference can be made to the above method embodiments.

In addition, a storage medium storing an MPPT control program is provided in the present disclosure. The MPPT control program, when executed by a processor, implements the MPPT control method.

It should be noted that, the term "including", "comprising" or any other variation thereof herein is intended to be non-exclusive. Therefore, a process, method, article, or system that includes a set of elements includes not only those elements, but also other elements not expressly listed, or elements inherent in such process, method, article, or system. Unless expressively limited otherwise, the element defined by the statement "comprising (including) a . . . " does not exclude the case that other similar elements may exist in the process, method, article or system including the element.

The serial numbers of embodiments of the present disclosure are for descriptive purposes only, instead of implying the merit of the embodiments.

From the description of the above embodiments, it is clear to those skilled in the art that the method in the above embodiments may be implemented by software plus necessary common hardware platform or implemented by hardware. However, the method is preferably implemented by software plus necessary common hardware platform in most cases. Based on such understanding, the technical solutions of the present disclosure or the part that makes contributions to the conventional technology may be substantially embodied in the form of a software product. The computer software product is stored in a storage medium (for example, a read only memory, a random access memory, a magnetic disk, or an optical disc), and contains several instructions for instructing a terminal device (which may be a mobile phone, a computer, a server, or a network device) to perform the method according to the embodiments of the present disclosure.

Only preferred embodiments of the present disclosure are described herein with no limitation on the scope of protection for the present disclosure. Any equivalent structure or process from the specification and the drawings of the present disclosure, or direct or indirect application in other related fields, is equally covered by the scope of protection of the present disclosure.

The invention claimed is:

1. A maximum power point tracking (MPPT) control method, applied to a photovoltaic inverter, wherein the photovoltaic inverter comprises: an inverter circuit and a plurality of direct-current conversion modules connected in parallel, the direct-current conversion modules each comprise a direct-current conversion circuit and a bypass switch connected in parallel, an input terminal of each of the direct-current conversion modules is configured to connect to a photovoltaic cell, and the MPPT control method comprises:

determining direct-current loss when the photovoltaic inverter is in operation, wherein the direct-current loss indicates power loss occurring at a direct-current side of the photovoltaic inverter; and/or determining conversion efficiency loss in the inverter circuit when the photovoltaic inverter is in operation, wherein the conversion efficiency loss indicates power loss in the inverter circuit; and MPPT controlling the photovoltaic inverter based on the direct-current loss and/or the conversion efficiency loss.

2. The method according to claim 1, wherein the direct-current loss comprises mismatched parallel loss and direct-current converter efficiency loss, and wherein the determining the direct-current loss when the photovoltaic inverter is in operation comprises:

determining the mismatched parallel loss when the photovoltaic inverter is in operation, wherein the mismatched parallel loss indicates power loss occurring when the photovoltaic cells are connected in parallel; and determining the direct-current converter efficiency loss when the photovoltaic inverter is in operation, wherein the direct-current converter efficiency loss indicates power loss in the direct-current conversion circuit.

3. The method according to claim 2, wherein the determining the mismatched parallel loss when the photovoltaic inverter is in operation comprises:

determining a working mode at a present moment, wherein the working mode is selected from: a first mode in which all the bypass switches are off, a second mode in which part of the bypass switches are off while the other bypass switches are on, and a third mode in which all the bypass switches are on; and determining the mismatched parallel loss based on the determined working mode.

4. The method according to claim 3, wherein the determining the mismatched parallel loss based on the determined working mode comprises:

determining a first electrical parameter curve for each of the photovoltaic cells in the first mode, wherein the first electrical parameter curve shows a relationship between a first current and a first voltage;

determining a peak power of the photovoltaic cell based on the first electrical parameter curve; and determining the mismatched parallel loss based on the peak power.

5. The method according to claim 4, wherein the determining the mismatched parallel loss based on the peak power comprises:

switching on all the bypass switches to connect the photovoltaic cells in parallel;

determining a combined electrical parameter curve for the photovoltaic cells connected in parallel;

determining a combined peak power based on the combined electrical parameter curve; and determining the mismatched parallel loss based on the peak power and the combined peak power.

6. The method according to claim 5, wherein the determining the mismatched parallel loss based on the peak power and the combined peak power comprises:

determining the mismatched parallel loss based on the peak power and the combined peak power from a preset formula:

$$\varphi = \frac{(P_{1-max} + P_{2-max} + \cdots P_{N-max}) - P_{all-max}}{P_{all-max}}$$

wherein $\varphi$ represents the mismatched parallel loss, $P_{1-max}$, $P_{2-max} \ldots P_{N-max}$ represent the peak powers for the respective photovoltaic cells, and $P_{all-max}$ represents the combined peak power.

7. The method according to claim 3, wherein the determining the mismatched parallel loss based on the determined working mode comprises:

determining a cell current set through the photovoltaic cells connected in parallel in the second mode or the third mode;

determining a second electrical parameter curve for the photovoltaic cells based on the cell current set, wherein the second electrical parameter curve shows a relationship between a second current and a second voltage; and determining the mismatched parallel loss based on the second electrical parameter curve.

8. The method according to claim 7, wherein the determining the second electrical parameter curve for the photovoltaic cells based on the cell current set comprises:

clustering currents through the respective photovoltaic cells in the cell current set, and acquiring the number of clusters;

determining a target photovoltaic cell among the photovoltaic cells if the number of clusters is greater than a preset number;

switching off the bypass switch corresponding to the target photovoltaic cell, and acquiring a second current and a second voltage for the photovoltaic cells; and constructing the second electrical parameter curve for the photovoltaic cells based on the second current and the second voltage.

9. The method according to claim 2, wherein the determining the direct-current converter efficiency loss when the photovoltaic inverter is in operation comprises:

acquiring a preset direct-current converter efficiency curve;

determining initial direct-current converter efficiency and target direct-current converter efficiency based on the preset direct-current converter efficiency curve, wherein the initial direct-current converter efficiency is presented before the photovoltaic inverter is in operation, and the target direct-current converter efficiency is presented when the photovoltaic inverter is in operation; and determining the direct-current converter efficiency loss based on the initial direct-current converter efficiency and the target direct-current converter efficiency.

10. The method according to claim 1, wherein the determining the conversion efficiency loss in the inverter circuit when the photovoltaic inverter is in operation comprises:

constructing an inverter circuit curve showing a relationship among an inverter circuit load factor, an inverter circuit voltage and inverter circuit efficiency;

determining a target inverter circuit voltage set and a corresponding target inverter circuit load factor set for voltage perturbation;

determining a target inverter circuit efficiency set based on the inverter circuit curve, the target inverter circuit voltage set and the target inverter circuit load factor set;

determining a maximum alternating-current output power of the inverter circuit based on the target inverter circuit efficiency set; and determining the conversion efficiency loss in the inverter circuit based on the maximum alternating-current output power and a direct-current input power of the inverter circuit.

11. The method according to claim 10, wherein the determining the maximum alternating-current output power of the inverter circuit based on the target inverter circuit efficiency set comprises:

determining a direct-current input power set corresponding to target inverter circuit voltages in the target inverter circuit voltage set;

determining an alternating-current output power set based on the direct-current input power set and the target inverter circuit efficiency set; and determining the maximum alternating-current output power of the inverter circuit based on a maximum value in the alternating-current output power set.

12. The method according to claim 1, wherein the MPPT controlling the photovoltaic inverter based on the direct-current loss and/or the conversion efficiency loss comprises:

determining a target working mode based on mismatched parallel loss and direct-current converter efficiency loss in the direct-current loss, and MPPT controlling the photovoltaic inverter; and/or MPPT controlling the photovoltaic inverter based on a maximum alternating-current output power in the conversion efficiency loss.

13. The method according to claim 12, wherein the determining the target working mode based on the mismatched parallel loss and the direct-current converter efficiency loss in the direct-current loss comprises:

switching on the corresponding bypass switch and determining the target working mode based on states of the bypass switches, in response to the mismatched parallel loss being less than the direct-current converter efficiency loss; and switching off the corresponding bypass switch and determining the target working mode based on states of the bypass switch, in response to the mismatched parallel loss being greater than the direct-current converter efficiency loss.

14. A maximum power point tracking (MPPT) control device, comprising:

a loss determination module, configured to determine direct-current loss when a photovoltaic inverter is in operation, wherein the direct-current loss indicates power loss occurring at a direct-current side of the photovoltaic inverter; and/or determine conversion efficiency loss in an inverter circuit when the photovoltaic inverter is in operation, wherein the conversion efficiency loss indicates power loss in the inverter circuit; and an MPPT control module, configured to MPPT control the photovoltaic inverter based on the direct-current loss and/or the conversion efficiency loss.

15. A non-transitory storage medium storing a program that, when executed by a processor, implements a maximum power point tracking (MPPT) control method, wherein the MPPT control method is applied to a photovoltaic inverter, the photovoltaic inverter comprises: an inverter circuit and a plurality of direct-current conversion modules connected in parallel, the direct-current conversion modules each comprise a direct-current conversion circuit and a bypass switch connected in parallel, an input terminal of each of the direct-current conversion modules is configured to connect to a photovoltaic cell, and the MPPT control method comprises:

determining direct-current loss when the photovoltaic inverter is in operation, wherein the direct-current loss indicates power loss occurring at a direct-current side of the photovoltaic inverter; and/or determining conversion efficiency loss in the inverter circuit when the photovoltaic inverter is in operation, wherein the conversion efficiency loss indicates power loss in the inverter circuit; and MPPT controlling the photovoltaic inverter based on the direct-current loss and/or the conversion efficiency loss.

*     *     *     *     *